United States Patent [19]
McDonald et al.

[11] Patent Number: 5,317,766
[45] Date of Patent: Jun. 7, 1994

[54] GRAY WATER RECYCLE SYSTEM

[75] Inventors: John R. McDonald, 171 Provident Dr., Boise, Id. 83706; Michael P. Henry, 1820 NW. 30th #2, Lincoln City, Oreg. 97367; Ronald J. Steele, Boise, Id.

[73] Assignees: John R. McDonald; Edward K. Rembert; Michael P. Henry, all of Boise, Id.

[21] Appl. No.: 78,828

[22] Filed: Jun. 21, 1993

Related U.S. Application Data

[62] Division of Ser. No. 820,476, Jan. 14, 1992, Pat. No. 5,243,719.

[51] Int. Cl.$^5$ .......................... A47K 4/00; E03C 1/12
[52] U.S. Cl. ........................................ 4/665; 4/415
[58] Field of Search ................................ 4/415, 665

[56] References Cited

U.S. PATENT DOCUMENTS

| | | | |
|---|---|---|---|
| 3,112,497 | 12/1963 | Call | 4/665 |
| 3,594,825 | 7/1971 | Reid | 4/665 |
| 4,030,144 | 6/1977 | Aleman | 4/665 |
| 4,069,521 | 1/1978 | Aleman | 4/665 |
| 4,162,218 | 7/1979 | McCormick | 4/665 |
| 5,035,011 | 7/1991 | Rozenblatt et al. | 4/665 |

FOREIGN PATENT DOCUMENTS 3434267  3/1986  Fed. Rep. of Germany .......... 4/665

Primary Examiner—Henry J. Recla
Assistant Examiner—Charles R. Eloshway
Attorney, Agent, or Firm—Jon Paul Busack

[57] ABSTRACT

A modular, retrofittable, and portable drain water recycle system, for installation into, and removal from, an existing host plumbing system having a host water supply, a sink, a tub or shower, a toilet, and a sewer. The modules include a drain fixture module, a system control module, and a storage tank module, all interconnectable. Gray water is collected from a tub, shower, or sink, by a drain fixture module, and is stored in a storage tank module for reuse in flushing a toilet. The drain fixture module and storage tank module are controlled by the system control module. Capacity can be altered by adding or removing storage tank modules. Different host systems can be accommodated by adding or removing drain fixture modules and system control modules. Drain fixture modules replace or are installed nearby existing P-traps, normally accessible. Storage tank modules and system control modules are of such shape and size as to fit under a typical sink inside the sink cabinet.

10 Claims, 10 Drawing Sheets

GRAY WATER RECYCLE SYSTEM

This is a divisional application of an original application having the same title, filed Jan. 14, 1992, Ser. No. 07/820,476, now U.S. Pat. No. 5,243,719.

BACKGROUND OF THE INVENTION

1. Field of the Invention

This invention relates to water conservation, particularly in the capture and reuse of gray water.

2. Discussion of Related Art

Water reclamation devices are well known. Many capture gray water generated from sinks, showers, and the like, for reuse in toilets and outside use. Here is a fair representation of the state of the art, in chronological order:

SYSTEM OF CONSERVING WATER IN A BUILDING, U.S. Pat. No. 4,924,536, issued May 15, 1990 to Houghton, herein incorporated by reference, is a manually operated system to conserve cold water that is normally wasted while a user is waiting for hot water to come out. This water is stored for use by a toilet. This is technically not a "gray" water conservation system, as the water reused never passed through a drain.

GRATE AND WATER RECOVERY SYSTEM, U.S. Pat. No. 4,349,436, issued Sept. 14, 1982 to Kaump, herein incorporated by reference, details a self-cleaning grate and a storage tank that automatically fills either with gray water or with fresh water, if gray water is not available. Water is pumped on demand from the tank for use by a toilet.

WATER RECYCLING WITH SOLIDS AND FOAM REMOVAL, U.S. Pat. No. 4,197,597, issued Apr. 15th, 1980 to Toms, herein incorporated by reference, is a water economizing system for new or existing buildings where gray water is captured, filtered, treated, and stored for use by toilets.

WATER REUSE SYSTEM, U.S. Pat. No. 4,162,218, issued Jul. 24th, 1979 to McCormick, herein incorporated by reference, shows how gray water may be automatically diverted by valves to a storage tank for toilet use. If the tank is full, the valves conduct gray water to the sewer. If the tank is empty but demanded, fresh water is provided. A pressure tank is included to provide constant pressure in reuse without overtaxing the pump.

APPARATUS AND ARRANGEMENT FOR CONSERVING WATER FOR TOILET FLUSHING, U.S. Pat. No. 4,030,144, issued Jun. 21st, 1977 to Aleman, herein incorporated by reference, shows a system where all gray water from a sink is filtered and diverted to a toilet tank for reuse. Overflow is handled by conventional overflow means within the toilet tank.

WATER CIRCULATION SYSTEM, U.S. Pat. No. 3,594,825, issued Jul. 27th, 1971 to Reid, herein incorporated by reference, discloses a system for use in a camper or boat, where a water reservoir supplies a shower and a sink, which drain into a collecting tank that supplies a toilet. The toilet drains into a holding tank.

WATER RE-USE SYSTEM, U.S. Pat. No. 3,318,449, issued May 9th, 1967 to Jennings et al. ("Jennings"), herein incorporated by reference, describes gray water entering a filter vessel which drains into a storage tank. Water is automatically pumped on demand from the storage tank to a toilet. When there is not enough gray water, fresh water is provided. The storage tank has an overflow for the event of too much gray water.

METHOD AND MEANS FOR OPERATING A TOILET IN A FALLOUT SHELTER, U.S. Pat. No. 3,183,525, issued May 18th, 1965 to O'Brien et al. ("O'Brien"), herein incorporated by reference, discloses fresh water provided from a storage tank to a shower and sink. The shower, sink, and a urinal drain to a second tank, which supplies a toilet.

WATER CONSERVATION SYSTEM, U.S. Pat. No. 3,112,497, issued Dec. 3rd, 1963 to Call, herein incorporated by reference, shows gray water received by a receiver tank. When the receiver tank is full, the gray water is automatically pumped to a storage tank. The storage tank has an overflow to the sewer, and a fresh water supply if not enough gray water is available. Gray water is then pumped on demand from the storage tank to a toilet. The toilet also has a fresh water supply if the gray water is not sufficient.

None of the systems above are easily retrofittable-that is, none can be easily adapted to an existing plumbing system without extensive modification.

Modularity is another highly desirable feature, not addressed in the cited art. If modularity were included, you could easily convert an existing plumbing system, or expand an already converted system, regardless of its configuration or size, by using standard modules. For example, if more gray water storage capacity were needed, you could just get another (modular) tank and insert it into the system, rather than replacing the existing tank with a larger one.

None of these systems are portable in the sense that the water reuse system can be easily removed from one installation and incorporated into another installation, as a user may desire when moving from one home to another. Reid is portable, being a camper system, and a camper is portable by design, but not in the sense that you could pull his system from one camper and install it in another.

It is also desirable to have unpressurized storage. In the event of tank failure, pressure can be disastrous, squirting gray water all over the place. A pump is desirable, because gravity feed has physical limitations as to where the tank can be located.

In the tanks presented, no consideration is given for aesthetics.

Although each of the cited inventions excel in individual ways, no single one overcomes all of the disadvantages.

SUMMARY OF THE INVENTION

The inventive system is intended to be retrofittable into multi-user dwellings such as apartment houses, hotels, duplexes, and the like, where plumbing is already in place, and great water savings may be realized by using gray water generated by a sink and a shower or tub, for example, for toilet flushing. The system is intended to be installed one per bathroom.

The inventive system includes three kinds of modules, which may be located remotely from each other, wherever space and preference permits:
  a drain fixture module, of which there may be more than one type, to adapt to different kinds of drains;
  a system control module, which contains pumps and pump controls; and a storage tank module, having a special bellows chamber and an outside shell, which needs no sewer vent or overflow.

The system control module and the storage tank module have an inoffensive appearance, so that they can be installed in the open, if necessary, without negatively impacting decor. Preferably they are of such shape and size to fit under a bathroom sink.

The inventive system is easily retrofittable to an existing host plumbing system, with a minimum of trauma to the host system. It taps into the host system at a drain, a supply, and at a toilet fill line, all of which are typically easily accessible. At most, a hole may have to be made to access a bathtub drain, for example.

The modularity of the system allows easy retrofitting to practically any architectural layout. To change capacity of the inventive system, a module is simply added or removed.

Because the inventive system is installed with a minimum of trauma to an existing system, it may also be removed if desired, returning the existing system to its prior state. The modules may then be taken with the user for installation elsewhere. The inventive system is therefore portable from host system to host system.

Intelligent use of pumps allows unpressurized gray water storage.

Further, the inventive system is not only useful in homes, but has great utility in multi-user dwellings, such as hotels, apartments, duplexes, and office buildings.

DETAILED DESCRIPTION OF THE PREFERRED EMBODIMENT

Figure 1:
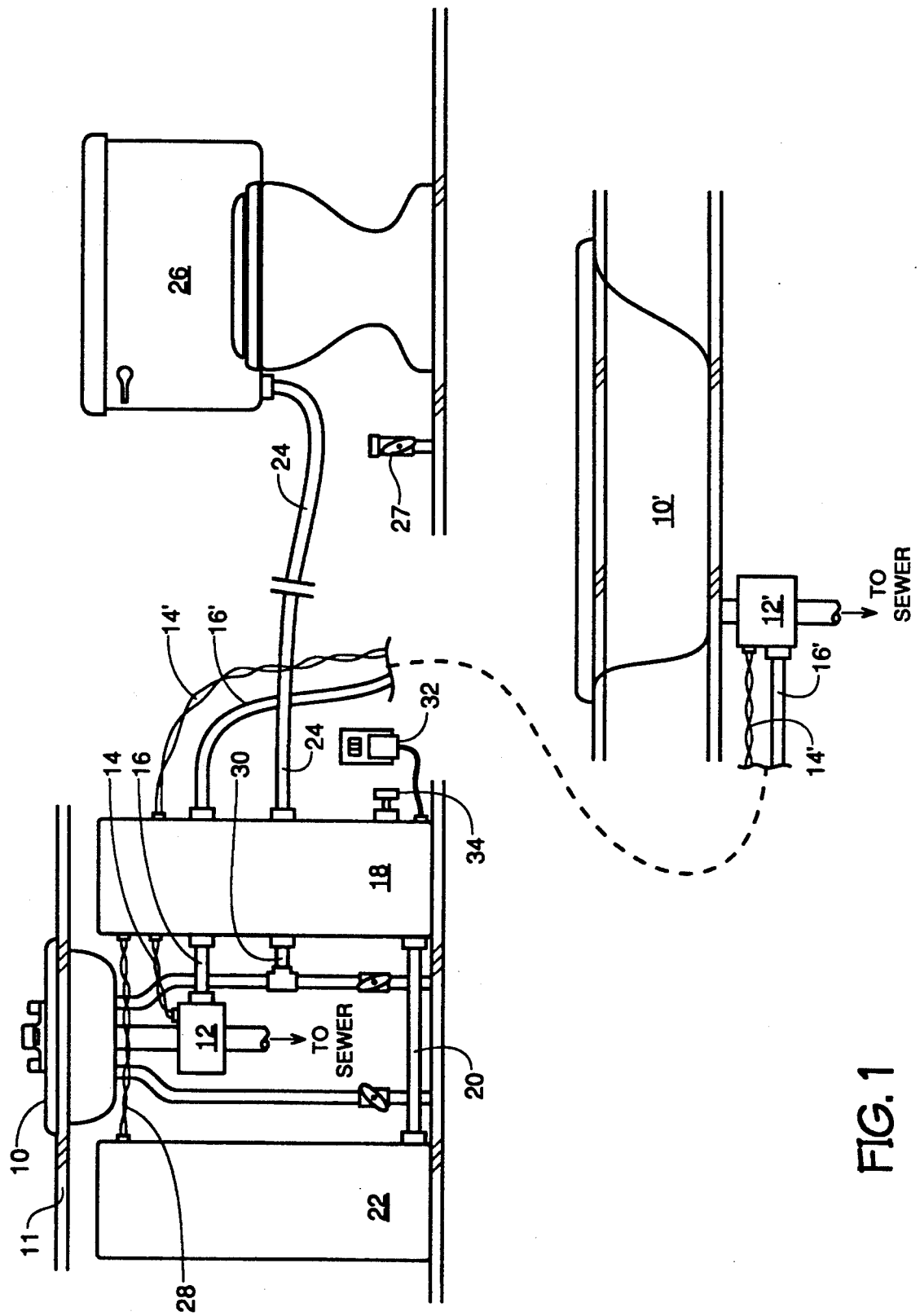
FIG. 1 shows a first embodiment of the inventive system as it might be installed in a representative bathroom.

FIG. 1 shows an embodiment of the inventive system in use in a typical bathroom. Sink 10 empties through drain fixture module 12. When system control module 18 senses gray water in fixture 12 through wires 14, it pumps it out of fixture 12 through conduit 16 and through conduit 20 for storage in storage tank module 22.

When toilet 26 is flushed, control module 18 senses low pressure in conduit 24 and pumps stored gray water out of storage tank module 22 through conduit 20 and through conduit 24 to toilet 26.

If storage tank module 22 is full, as sensed by the control module through wires 28, for example, and gray water passes through fixture 12, no gray water is pumped out of fixture 12 and it conventionally passes to sewer.

If storage tank module 22 is empty, and toilet 26 is flushed, control module takes water from house supply through conduit 30 to provide toilet 26.

If the inventive system needs to be shut off, as in the case of repair or maintenance, for example, power supply 32 may be disconnected and bypass valve 34 turned. House supply water is then provided to toilet 26 by way of conduit 30 and conduit 24. Alternatively, solenoid valve 108 may be chosen to open upon power loss, so making emergency connection to house supply water automatic.

Gray water from tub or shower 10' is captured similarly, by way of drain fixture module 12', wires 14', and conduit 16'.

Notice that the inventive system is easily retrofittable into an existing host system: storage tank module 22 and system control module 18 are of such shape and size as to fit under a counter top 11, and they tap into the host system by way of fixtures 12 and 12' and conduits 16, 16', and 24. Conventional toilet supply 27 is capped. Because system control module 18 moves water by pumping, conduits 16, 16', and 24 need not be especially large—$\frac{1}{4}$ inch tubing, for example, is sufficient. Small diameter tubing is further preferred because it can be easily incorporated into existing decor by running behind a wall's base trim, for example.

Notice also that because the inventive system taps into a host system at a minimum number of points, the inventive system may be installed into and removed from the host system with a minimum of trauma to the host system. This feature also makes the inventive system portable from host system to host system. A host system must comprise a host water supply, a sewer, one toilet, one sink, and one tub or shower.

Overall operation and advantage of the inventive gray water reclaim system is now clear. Further features and embodiments of the modules are now detailed.

Figure 2:
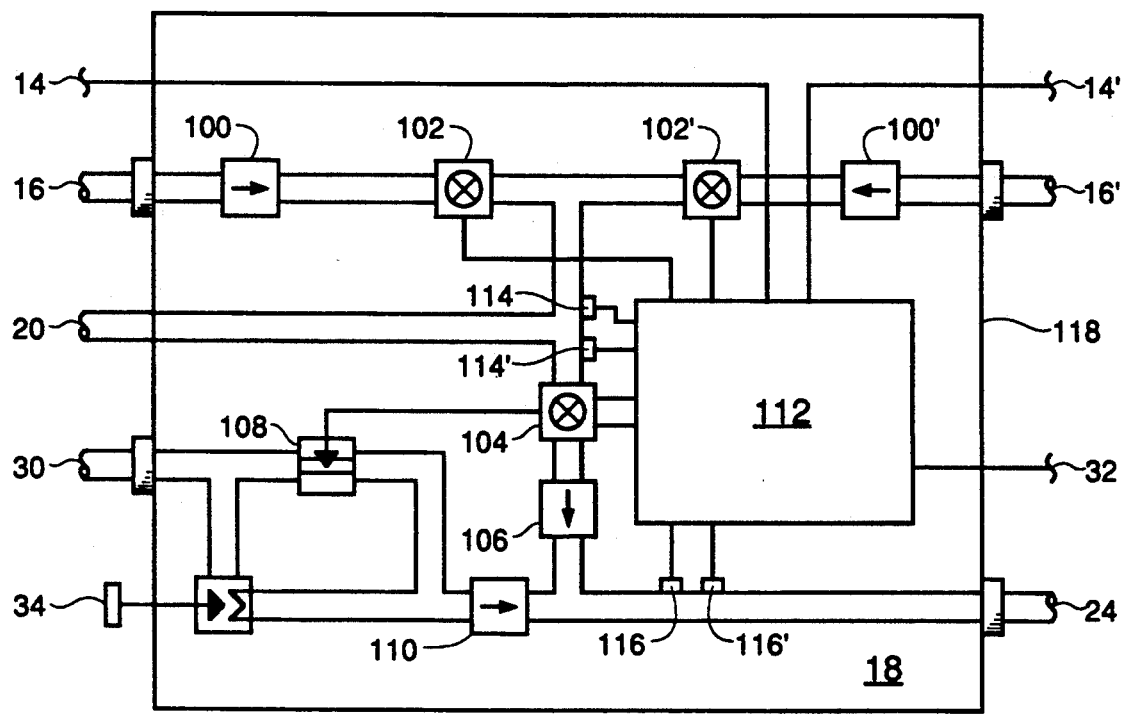
FIG. 2 details a first embodiment of a system control module.

FIG. 2, taken with FIGS. 1, 3, 4, and 5, represents a first embodiment. FIG. 1 is accurate for this embodiment except wires 28 are not needed.

Gray water from sink fixture module 12 flows through conduit 16 into system control module 18. Within control module 18, gray water flows through check valve 100 and is pumped by pump 102 into storage tank module 22 through conduit 20.

When toilet 26 is flushed, gray water is pumped to it by pump 104 out of storage module 22 through conduit 20, check valve 106, and conduit 24.

When toilet 26 is flushed and storage module 22 is empty, solenoid valve 108 is opened, allowing fresh water from conduit 30 to pass through check valve 110 to toilet 26 through conduit 24.

Manual bypass 34 is normally closed. When open, fresh water is allowed to flow from conduit 30, through check valve 110 and to toilet 26 through conduit 24.

Control of pumps 102, 102', 104 and solenoid valve 108 is done by control circuit 112. Control circuit 112 senses the state of the water reclaim system by drain fixture sense wires 14 and 14' and high and low pressure sensors 114 and 114' and high and low pressure sensors 116 and 116'.

System control module 18 includes housing 118, which is of appropriate size and shape to fit under a bathroom sink, for example.

Figure 3:
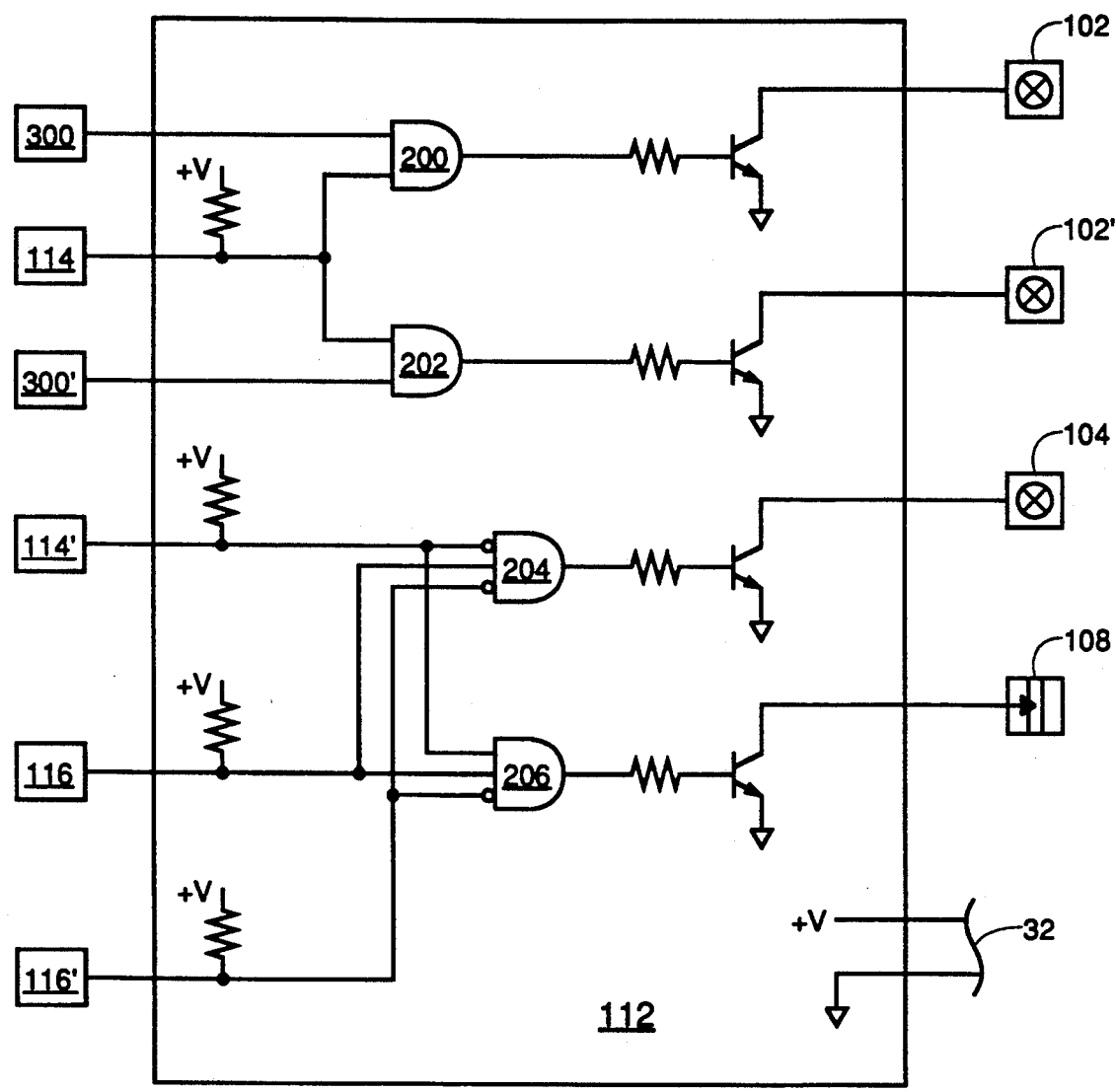
FIG. 3 details logical Control of the module of FIG. 2.

FIG. 3 illustrates in terms anyone of ordinary skill in electronic controls will understand. Fluid level sensors 300 and 300' are active high Sensors 114, 114', 116 and 116' are normally open, closing on activation to ground, thus providing active low signals. Here is a brief description of the operation of control circuit 112.

When gray water flows through drain fixture 12, the fluid is sensed by sensor 300, providing a high signal to logic element 200. Similarly, fluid in drain fixture module 12' is sensed by sensor 300', providing a high signal to logic element 202. If storage module 22 is full, high pressure sensor 114 will send a low signal to logic elements 200 and 202. It is therefore clear that pump 102 will turn on only when storage module 22 is not full and there is fluid in drain fixture module 12, and that pump 102' will turn on only when storage module 22 is not full and there is fluid in drain fixture module 12'.

At logic element 204, when a minimum pressure is sensed at sensor 114' as a low signal, indicating that some gray water is stored in storage module 22, and less than full toilet tank pressure is sensed at sensor 116, as a high signal, and minimum operating pressure is sensed by sensor 116' as a low signal, indicating that no catastrophic leak has occurred, pump 104 is activated, pumping water from storage module 22 through check valve 106 and conduit 24 to toilet 26.

Logic element 206 operates similarly to logic element 204, except that the signal from sensor 114' is inverted, indicating an empty storage tank module 22. This means that when less than full toilet tank pressure is sensed at sensor 116, as a high signal, and minimum operating pressure is sensed by sensor 116', as a low signal, and storage module 22 is empty, as sensed by sensor 114', solenoid valve 108 is activated by logic element 206, allowing fresh water to flow from host supply 30, through check valve 110 and conduit 24, to toilet 26.

When the system is activated, manual override valve 34 is closed. To override the inventive system, open override valve 34. Conduit 24 is immediately brought up to host supply pressure through check valve 110. Because conduit 24 is brought up to host system pressure, sensor 116 never senses an empty toilet and pump 104 is never activated.

Figure 4A:
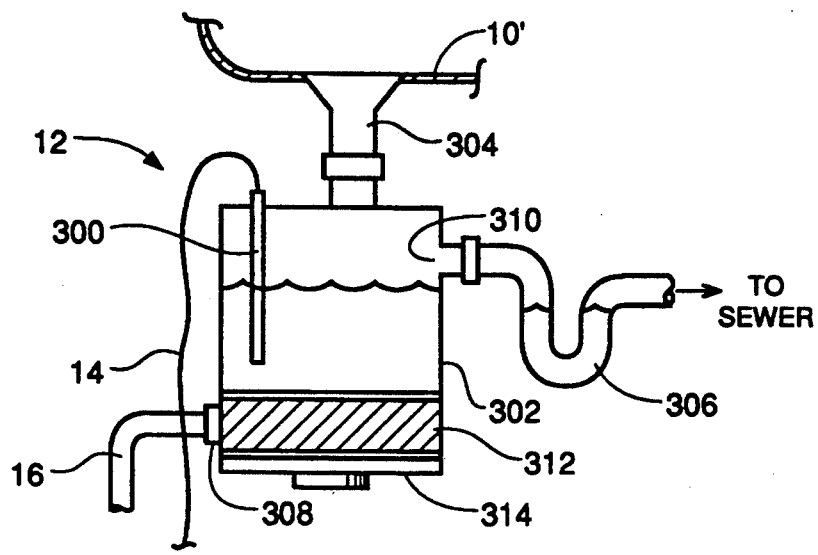
FIGS. 4A-4C detail embodiments of the inventive drain fixture modules.
Figure 4B:
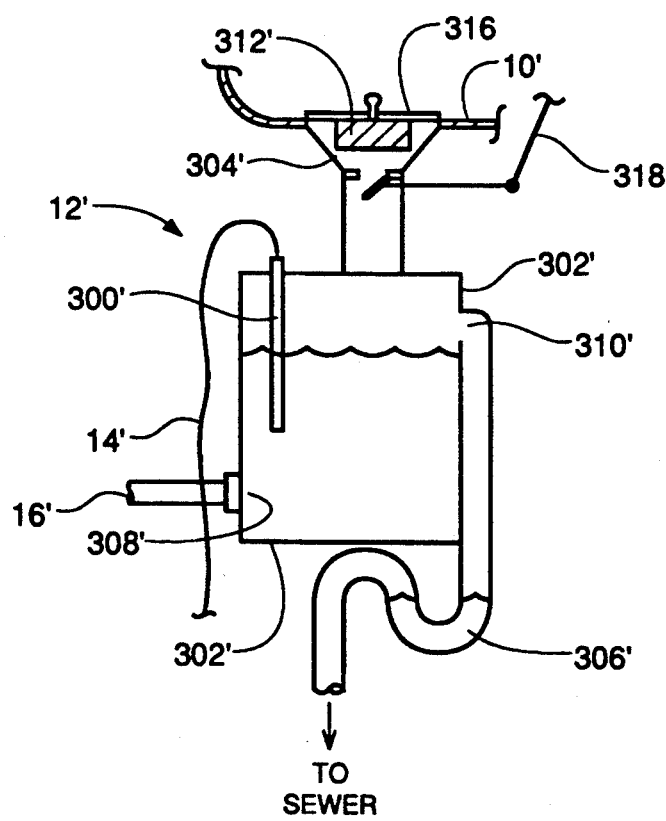
Figure 4C:
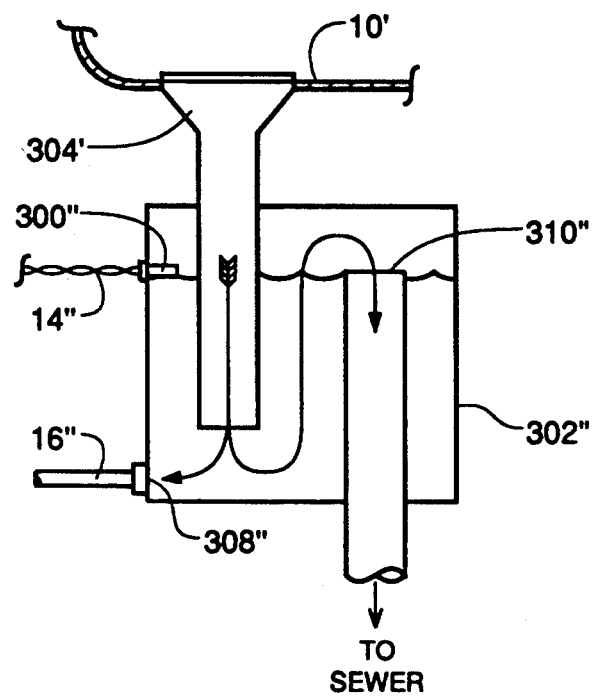

Drain fixture modules 12 and 12' are detailed in FIGS. 4A and 4B. Drain fixture module 12 is designed to be installed under a sink in the host system, and consists of drain chamber 302 and sensor 300, which connects to control module 18 through wires 14. Chamber 302 is installed between existing host drain 304 and P-trap 306. When sink 10 drains, chamber 302 fills with gray water, which is sensed by sensor 300, triggering control module 18 to pump the gray water out through reuse port 308 and conduit 16. If gray water is not so captured, it naturally exits through spillover 310, through P-trap 306, and into host system sewer.

Removable filter 312 is interposed before reuse port 308 to keep hair and such from clogging said port, and is accessed for cleaning and changing from below, via filter door 314.

Drain fixture module 12' is similar to fixture 12, except that filter 312' is provided right at the bathtub 10' drain, and is accessible from above, via removable screen 316. Because existing host bathtub drain 304' is used, existing plug and linkage 318 remains usable.

Figure 5:
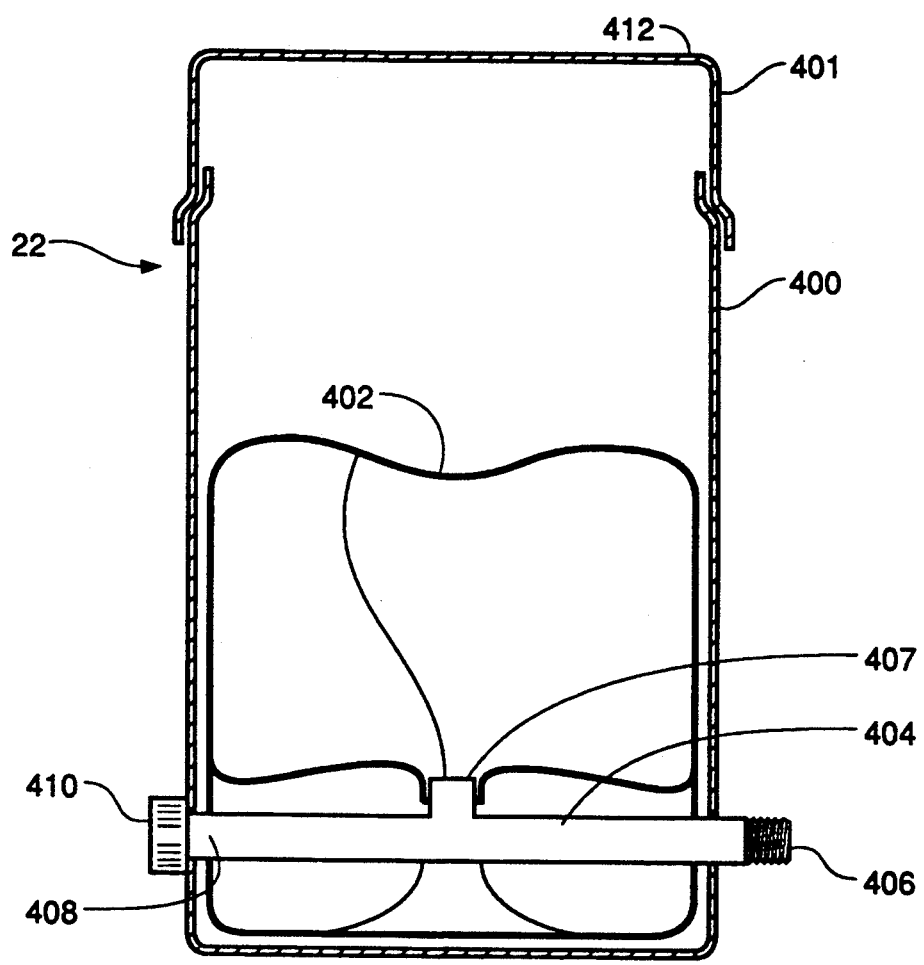
FIG. 5 details a first embodiment of the inventive storage tank module.

As detailed in FIG. 5, inventive storage tank module 22 comprises shell 400 with lid 401, bladder bag 402, conduit 404 with inlet 406, outlet 408, and bladder port 407, and air vent 412 which preferably is in lid 401 but could be located in shell 400. Cap 410 is shown sealing outlet 408. Tank 22 attaches into the inventive system at inlet 406. Another tank module may be chained into the inventive system by attachment of its inlet to already described outlet 408. In this modular manner, any number of tanks may be incorporated into the inventive system, accommodating any gray water storage capacity desired.

In use, gray water is pumped into inlet 406, through conduit 404 and bladder port 407, and into bladder bag 402. As bladder 402 fills and expands, air is vented out of shell 400 through vent 412. Use of bladder bag 402 allows tank module 22 to sit remotely from any sewer or sewer vent access, because no spillover or sewer venting occurs. The gray water is contained within a closed system. Further, when tank 22 needs cleaning, bladder bag 402 containing sediment may be removed and disposed of, and a new bag installed.

As with control module 18, shell 400 is of appropriate size so as to fit under a bathroom sink. Bladder bag 402 is preferably made of rubber or equivalent.

Figure 6:
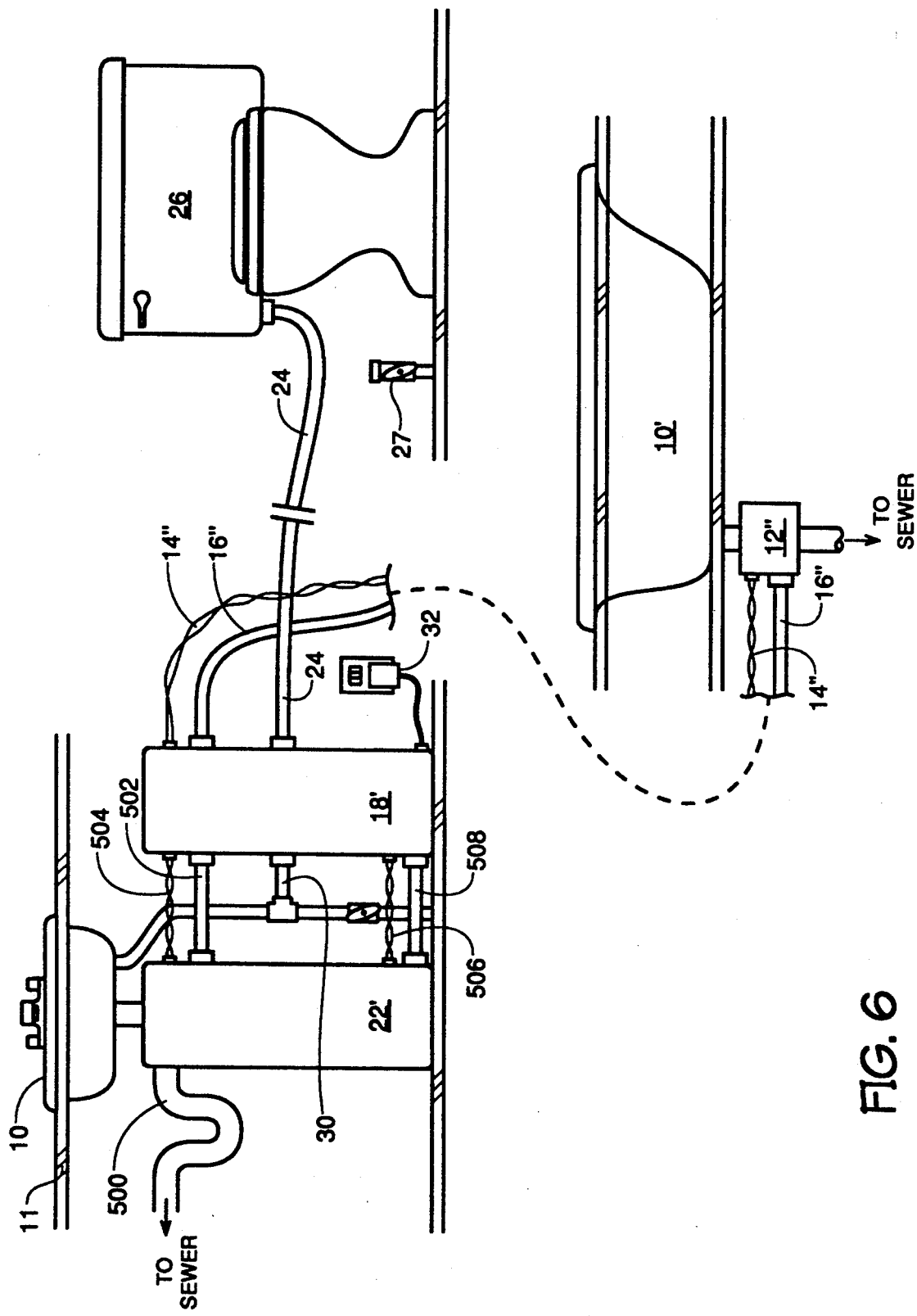
FIG. 6 shows a second embodiment of the inventive system as it might be installed in a representative bathroom.
Figure 7:
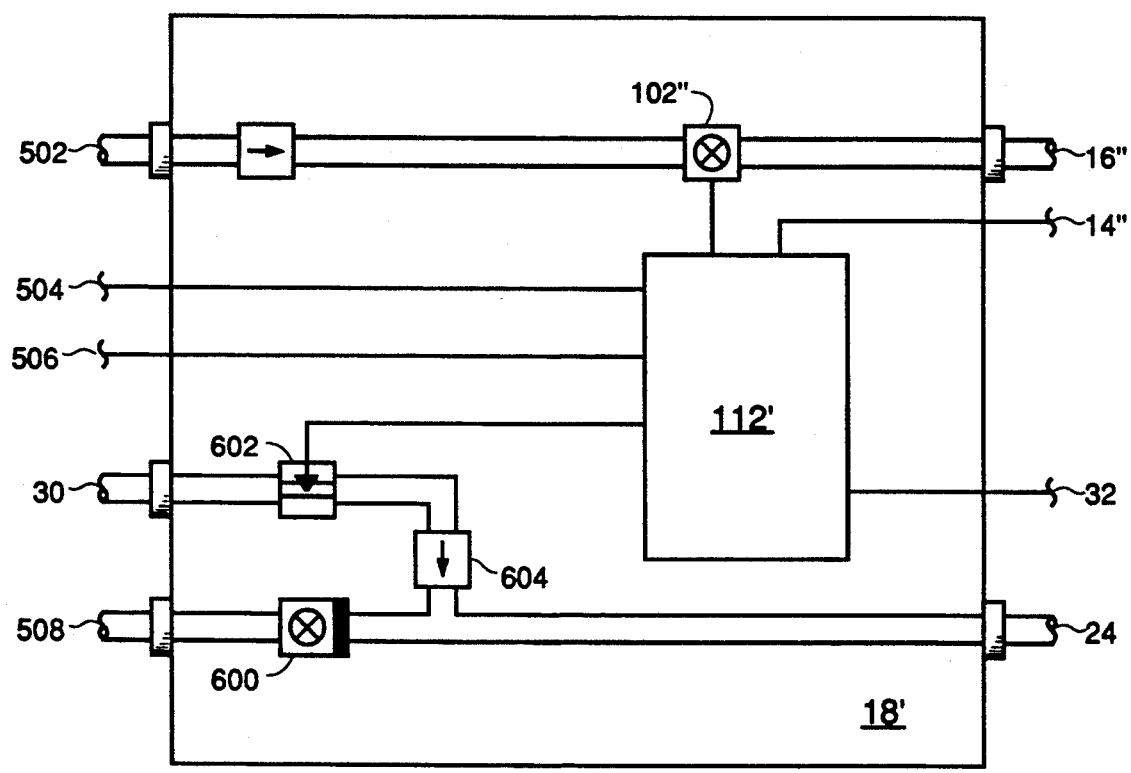
FIG. 7 details a second embodiment of a system control module.

FIG. 6, taken with FIGS. 4 and 7-9, represents a second embodiment of simpler design.

In this second embodiment, sink 10 drains directly into storage tank module 22', which has an overflow 500 to host sewer. Storage module 22' and control module 18' fit under sink 10.

As in the first embodiment, when tub 10' drains, the presence of fluid is sensed through wires 14'' by control module 18', and is pumped through conduit 16'' by pump 102'' to storage module 22' through conduit 502.

When toilet 26 is flushed, low toilet pressure is automatically sensed by pressure-sensing pump 600, and gray water is automatically pumped from storage module 22' to toilet 26 through conduits 508 and 24.

When storage tank module 22' is full, gray water automatically empties through overflow 500. When storage module 22' is empty, as sensed by control circuit 112' at sensor 802 through wires 506, solenoid valve 602 is opened, allowing host water to run to toilet 26 from host supply 30, through check valve 604 and through conduit 24. Because conduit 24 is then at host system pressure, pump 600 does not sense low pressure and therefore does not activate.

Solenoid valve 602 is configured so that if power is lost, it will open, allowing toilet 26 to fill just as if the inventive system wasn't there.

Figure 8:
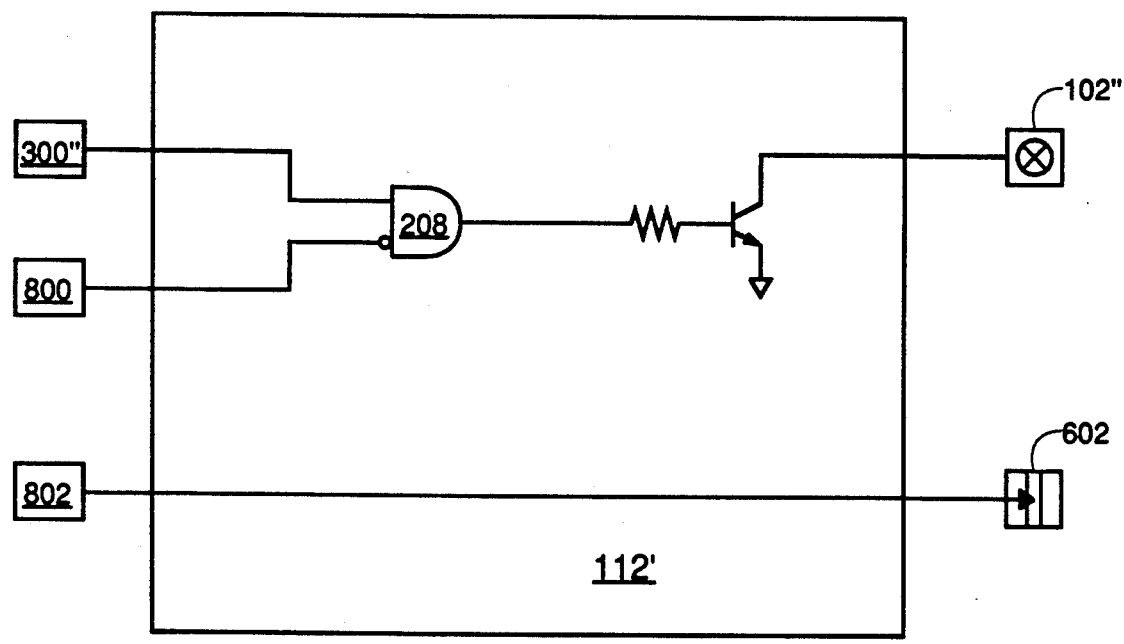
FIG. 8 details logical control of the module of FIG. 7.
Figure 9:
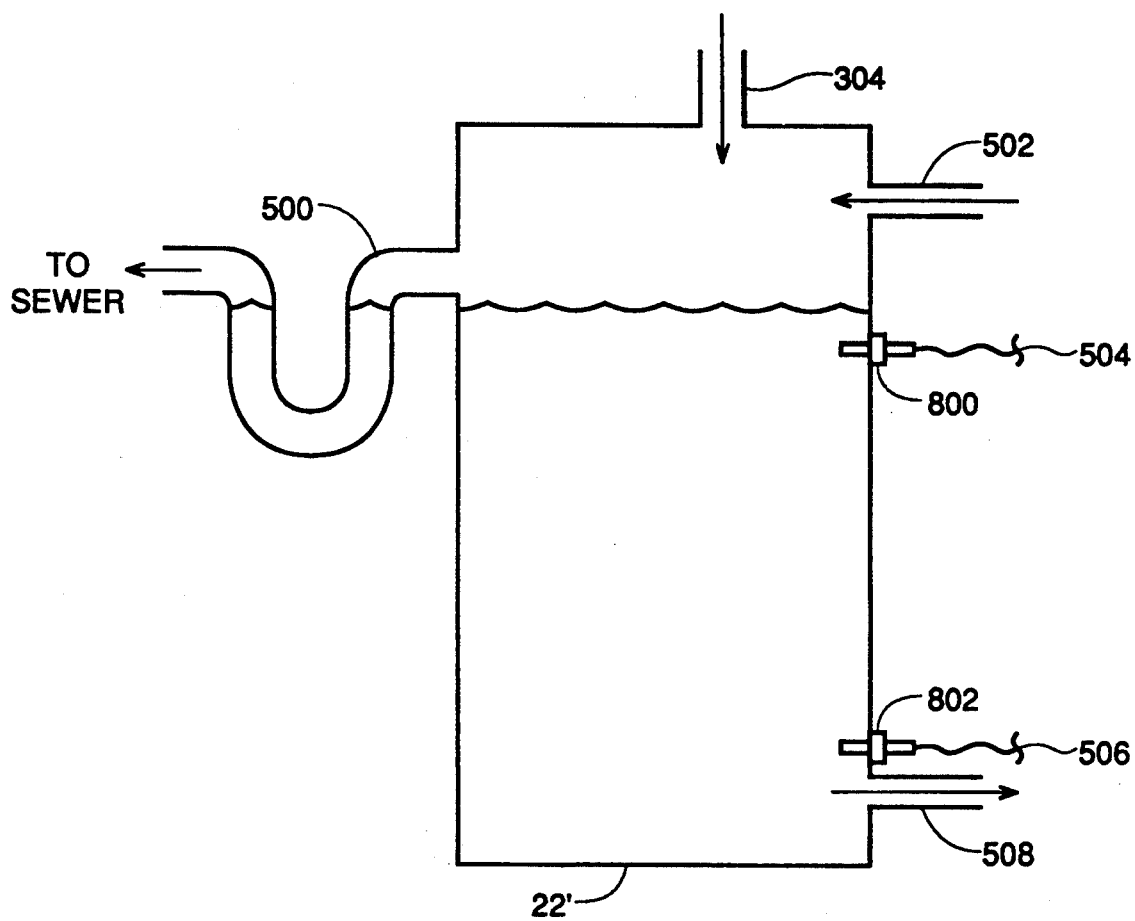
FIG. 9 shows a second embodiment of the inventive storage tank module.

FIG. 8 details logical operation of control circuit 112' in a manner any one of ordinary skill in electronic controls will understand.

When logic element 208 senses fluid in drain fixture 12'' by a positive logic signal from sensor 300'', and senses that storage module is not full by a negative logic signal from sensor 800, it activates pump 102'' to pump gray water from drain fixture 12'' through conduits 16'' and 502, to storage module 22'.

When storage module 22' is empty, as sensed by sensor 802, solenoid valve 602 is automatically opened, allowing the host system, instead of storage module 22', to supply toilet 26 through conduit 30, check valve 604, and conduit 24.

Now that operation of the inventive system and its parts has been described, preferred parameters are now detailed. Host system supply is assumed to be approximately 60 pounds per square inch (psi). Sensors 300, 300', 300'', 800 and 802 are simple fluid level detectors. Sensor 114 activates at approximately 2 psi, or at such pressure provided when storage tank module 22 is full. Sensor 114' activates at approximately 1 psi or less, or at such pressure provided when storage tank module 22 is empty. Sensor 116 activates at approximately 50 psi, or at such pressure provided when water is being sent to toilet 26 by pump 104 or by host system through conduit 30. Sensor 116' activates at approximately 1 psi, or at such pressure provided when there is a catastrophic leak in conduit 24 or toilet 26.

There are further considerations for the ideal use of this inventive gray water reuse system. One is the matter of possible distasteful smell or appearance of gray water in a clean toilet bowl. Many point-of-use products are already available which will sterilize, deodorize, and colorize this water for toilet use, such as the type which sit inside the toilet tank and automatically dispense as water flows through. Our recommendation is "2001 Flushes" or the like, a deodorizing and bluing agent, well known and commonly available in most grocery stores.

Preferable size for system control module 18 and storage tank module is within approximately 18" high by 12" wide by 24" deep for each, or of such size to fit under a typical bathroom sink.

Check valves, fluid level sensors, fluid pressure sensors, solenoid valves, and pumps are well known and widely available. Pressure-sensing pump 600 is of the type commonly used in recreational vehicles. Plumbing between the modules is according to local codes where installation occurs.

Modules herein described may be made of plastic, metal, a polyvinylchloride material, or any other material suitable for plumbing and decorating purposes. Modules which may be in view, such as the storage tank module and the system control module, may be of any desired color or decorative design.

We wish it to be understood, and it has been so illustrated in this specification, that by "modular" we mean interconnectable parts, or modules, usable within the gray water reclaim system so that when the system needs modification or repair, one or modules are added or removed. A "module" is a subcomponent of the reclaim system, such as a drain fixture module, a storage tank module, or a system control module, as herein specified and claimed.

It further should be understood that by "retrofittable", we mean a gray water reclaim system that can be adapted to an existing plumbing system with a minimum of trauma to the existing plumbing system. By "minimum of trauma" we mean that the inventive system installable with little or no modification to an existing structure which houses the host plumbing system. At most, an access hole may need to be made to install a drain fixture at a bathtub or shower P-trap, for example.

It also should be understood that the inventive system is also "portable", that is, because it is adaptable to a host plumbing system with a minimum of trauma, it may be removed from said host system with a minimum of trauma, so being portable from one host plumbing system to another host plumbing system. "Portable" means that the inventive gray water reclamation system may be removed from one site and installed in another site with a minimum of trauma to either site.

Generally speaking, "gray water" is refuse water from a sink, tub, Shower, or the like, which, although not as repulsive as sewer water, is still something you would rather not drink, yet is clean enough for secondary uses like flushing a toilet.

Clearly, many variations may be made to this inventive system, and even more than usual because its modularity allows ease of installation and high adaptability to a variety of configurations. Electronics is a wide art, and there are many ways immediately apparent that the schematics of FIGS. 3 and 8 may be implemented.

We claim:

1. A modular and portable gray water reclaim system that is retrofittable into a host system containing at least a host water supply, a sink having a drain outlet, a tub or shower having a drain outlet, a toilet, and a sewer, the gray water reclaim system comprising:

first and second drain fixture modules, a system control module, and a storage tank module;

said first drain fixture module interconnectable with the host system sink drain outlet and the host system sewer and said system control module;

said second drain fixture module interconnectable with the host system tub or shower drain outlet and the host system sewer and said system control module;

said system control module interconnectable with said first and second drain fixture modules, with said storage tank module, with the host system water supply, and with the host system toilet;

said storage tank module interconnectable with said system control module;

so that said system control module can receive gray water from said first and second drain fixture modules and deliver it to said storage tank module when said storage tank module is not full, and so that said system control module can receive gray water from said storage tank module and deliver it to the host system toilet when said storage tank module is not empty, and so that said system control module can receive water from the host system water supply and deliver it to the host system toilet when said storage tank module is empty;

said system control module and said storage tank module being of such size and shape as to fit under the host system sink, said first drain fixture module being configured to act as host system sink P-trap, and said second drain fixture module being configured to act as a host system tub or shower P-trap;

modularity, in that the gray water reclaim system comprises said interconnectable modules;

retrofittability with a minimum of trauma to the host system, in that the gray water reclaim system taps into the host system by substituting the first and second drain fixture modules for the host system sink P-trap and the host system tub or shower P-trap, and in that said system control module and said storage tank module fit under the host system sink;

portability from the host system to another host system, in that each of said modules of the gray water reclaim system may be removed from the host system and retrofitted afresh with a minimum of trauma into another host system.

2. The gray water reclamation system of claim 1, wherein one of said drain fixture modules comprises:

a chamber, having a liquid level sensor, a reuse port in a lower portion of said chamber, a spillover port in an upper portion of said chamber, and a P-trap;

wherein said chamber replaces a host system P-trap in such a way that gray water enters said chamber and is sensed by said sensor, and in such a way that said system control module receives gray water from said chamber through said reuse port, and in such a way that gray water not passing through said reuse port passes through said spillover into said P-trap to host system sewer.

3. The gray water reclamation system of claim 2, wherein said one of said drain fixture modules further comprises a filter, disposed in such a way that gray water must go through said filter before passing through said reuse port.

4. The gray water reclamation system of claim 2, wherein said system control module comprises:
- a housing, and within said housing:
- a first pump and first check valve, to pump gray water from said drain fixture module to said storage tank module, with no backflow;
- a second pump and second check valve, to pump gray water from said storage tank module to the host system toilet, with no backflow;
- a solenoid valve and third check valve, to allow flow from the host system water supply to the host system toilet;
- a manual override valve, which, when open, allows flow from the host system water supply to the host system toilet;
- first and second pressure sensors arranged to sense full and empty levels in said storage tank module;
- third and fourth pressure sensors arranged to sense full and empty levels in the host system toilet;
- a control circuit;
- said control circuit, pumps, valves, and sensors, connected in such a way that said control circuit can read said first, second, third, and fourth sensors and said drain fixture module sensor, and control said first and second pumps, said solenoid valve,
- so that when gray water is sensed by said control circuit through said drain fixture module sensor and said storage tank module is sensed non-full by said control circuit through said first and second sensors, said control circuit activates said first pump to pump gray water from said drain fixture module to said storage tank module,
- and so that when the host system toilet is sensed empty by said control circuit through said third and fourth sensors and said storage tank module is sensed non-empty by said control circuit through said first and second sensors, said control circuit activates said second pump to pump gray water from said storage tank module to the host system toilet,
- and so that when the host system toilet is sensed empty by said control circuit through said third and fourth sensors and said storage tank module is sensed empty by said control circuit through said first and second sensors, said control circuit opens said solenoid valve, to provide host system water to the host system toilet,
- and so that when said manual override valve is open, pressure is always sensed by said control circuit through said third sensor and said control circuit does not activate any of said pumps and said solenoid valve.

5. The gray water reclamation system of claim 1, wherein said storage tank module comprises:
- a shell, having a lid;
- a bladder bag inside said shell;
- a vent in said shell, to maintain zero pressure, referenced to atmospheric pressure, within said shell;
- a conduit inside said shell, having an inlet, an outlet, and
- a bladder port, said inlet and outlet passing outside said shell, said bladder port connected to said bladder bag inside said shell;
- so that, with said outlet capped, gray water may pass into said inlet and into said bladder bag, said bladder bag extending and shrinking according to gray water volume within said bladder bag;
- and so that said outlet may be interconnected to an inlet of some other storage tank module, so increasing total storage capacity in a modular manner.

6. A modular and portable gray water reclaim system that is retrofittable with a minimum of trauma into a host system containing at least a host water supply, a sink having a drain outlet, a toilet, and a sewer, the gray water reclaim system comprising:
- a drain fixture module;
- a system control module, having a size and shape so as to fit under the host system sink;
- a storage tank module, having a size and shape so as to fit under the host system sink;
- said drain fixture module, said system control module, and said storage tank module interconnectable to each other and interconnectable to the host system so that said drain fixture module is configured to act as a host system P-trap and capture gray water flowing therethrough to the host system sewer, so that said system control module is able to provide gray water to said storage tank module from said drain fixture module, and so that said system control module is able to provide gray water from said storage tank module to the host system toilet, and so that said system control module is able to provide fresh water from the host system water supply to the host system toilet when said storage tank module is empty.

7. The gray water reclamation system of claim 6, wherein said drain fixture module comprises:
- a chamber having a liquid level sensor, a reuse port in a lower portion of said chamber, a spillover port in a upper portion of said chamber, and a P-trap;
- wherein said chamber replaces a host system P-trap in such a way that gray water enters said chamber and is sensed by said sensor, and in such a way that said system control module receives gray water from said chamber through said reuse port, and in such a way that gray water not passing through said reuse port passes through said spillover into said P-trap to host system sewer.

8. The gray water reclamation system of claim 7, wherein said drain fixture module further comprises a filter, disposed in such a way that gray water must go through said filter before passing through said reuse port.

9. The gray water reclamation system of claim 7, wherein said system control module comprises:
- a housing, and within said housing:
- a first pump and first check valve, to pump gray water from said drain fixture module to said storage tank module, with no backflow;
- a second pump and second check valve, to pump gray water from said storage tank module to the host system toilet, with no backflow;
- a solenoid valve and third check valve, to allow flow from the host system water supply to the host system toilet;
- a manual override valve, which, when open, allows flow from the host system water supply to the host system toilet;

first and second pressure sensors arranged to sense full and empty levels in said storage tank module;
third and fourth pressure Sensors arranged to sense full and empty levels in the host system toilet;
a control circuit;
said control circuit, pumps, valves, and sensors, connected in such a way that said control circuit can read said first, second, third, and fourth sensors and said drain fixture module sensor, and control said first and second pumps, said solenoid valve,
so that when gray water is sensed by said control circuit through said drain fixture module sensor and said storage tank module is sensed non-full by said control circuit through said first and second sensors, said control circuit activates said first pump to pump gray water from said drain fixture module to said storage tank module,
and so that when the host system toilet is sensed empty by said control circuit through said third and fourth sensors and said storage tank module is sensed non-empty by said control circuit through said first and second sensors, said control circuit activates said second pump to pump gray water from said storage tank module to the host system toilet,
and so that when the host system toilet is sensed empty by said control circuit through said third and fourth sensors and said storage tank module is sensed empty by said control circuit through said first and second sensors, said control circuit opens said solenoid valve, to provide host system water to the host system toilet,
and so that when said manual override valve is open, pressure is always sensed by said control circuit through said third sensor and said control circuit does not activate any of said pumps and said solenoid valve.

10. The gray water reclamation system of claim 7, wherein said storage tank module comprises:
a shell;
a bladder bag inside said shell;
a conduit inside said shell, having an inlet, an outlet, and a bladder port, said inlet and outlet passing through said shell to its outside, said bladder port connected to said bladder bag inside said shell;
so that, with said outlet capped, gray water may pass into said inlet and into said bladder bag, said bladder bag expanding and shrinking according to gray water volume within said bladder bag;
and so that said outlet may be interconnected to an inlet of some other storage tank module, so increasing total storage capacity in a modular manner.

* * * * *